(12) United States Patent
Kremer et al.

(10) Patent No.: US 10,850,352 B2
(45) Date of Patent: Dec. 1, 2020

(54) METHOD OF LASER CUTTING GROOVES IN A FRICTION CLUTCH PLATE

(71) Applicant: GM GLOBAL TECHNOLOGY OPERATIONS LLC, Detroit, MI (US)

(72) Inventors: John M Kremer, Sterling Heights, MI (US); Huaxin Li, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 112 days.

(21) Appl. No.: 15/849,784

(22) Filed: Dec. 21, 2017

(65) Prior Publication Data

US 2019/0193207 A1     Jun. 27, 2019

(51) Int. Cl.
| | |
|---|---|
| *B23K 26/364* | (2014.01) |
| *B23K 26/38* | (2014.01) |
| *F16D 65/12* | (2006.01) |
| *F16D 13/64* | (2006.01) |
| *F16D 65/02* | (2006.01) |
| *B23K 103/16* | (2006.01) |

(Continued)

(52) U.S. Cl.
CPC ............ *B23K 26/364* (2015.10); *B23K 26/38* (2013.01); *F16D 13/648* (2013.01); *F16D 65/127* (2013.01); *B23K 2103/172* (2018.08); *F16D 13/72* (2013.01); *F16D 13/74* (2013.01); *F16D 2065/1364* (2013.01); *F16D 2069/004* (2013.01); *F16D 2069/0466* (2013.01); *F16D 2250/003* (2013.01); *F16D 2250/0023* (2013.01); *F16D 2250/0046* (2013.01)

(58) Field of Classification Search
CPC ............................ B23K 26/38; B23K 26/364
See application file for complete search history.

(56) References Cited

U.S. PATENT DOCUMENTS

| | | |
|---|---|---|
| 1,132,958 A | 3/1915 | Miller |
| 1,833,414 A | 3/1930 | Cram |

(Continued)

FOREIGN PATENT DOCUMENTS

| | | |
|---|---|---|
| DE | 10201445654 A1 | 6/2016 |
| EP | 0801247 | 10/1997 |

(Continued)

OTHER PUBLICATIONS

Machine translation of Japan Patent document No. JP-2014-133,242-A, Jan. 2020.*

*Primary Examiner* — Geoffrey S Evans

(57) ABSTRACT

A friction clutch assembly for an automatic transmission, a friction clutch plate, and a method of forming a friction clutch plate are provided. The method includes providing a friction material layer for a face of the friction clutch plate and cutting the friction material layer with a laser beam to form a plurality of grooves within the friction material layer. In one version, a friction plate for the friction clutch assembly includes an annular core plate having first and second opposed faces and defining an outer edge and an inner edge. Friction material is affixed to at least one of the first and second opposed faces. The friction material defines a plurality of grooves within the friction material, each groove being bordered by friction material having a ridge. The cross-section of the ridge has a corner having a radius of curvature that is less than 300 microns.

11 Claims, 7 Drawing Sheets

(51) Int. Cl.
*F16D 13/72* (2006.01)
*F16D 13/74* (2006.01)
*F16D 69/00* (2006.01)
*F16D 69/04* (2006.01)

(56) References Cited

U.S. PATENT DOCUMENTS

| | | | |
|---|---|---|---|
| 3,249,189 A | 5/1966 | Schjolin et al. |
| 3,366,209 A | 1/1968 | Lindquist et al. |
| 4,260,047 A | 4/1981 | Nels |
| 4,267,912 A | 5/1981 | Bauer et al. |
| 4,396,100 A | 8/1983 | Eltze |
| 4,865,177 A | 9/1989 | Murakami |
| 4,995,500 A | 2/1991 | Payvar |
| 5,004,089 A | 4/1991 | Hara et al. |
| 5,048,659 A | 9/1991 | Tojima |
| 5,093,057 A | 3/1992 | Hara et al. |
| 5,094,331 A | 3/1992 | Fujimoto et al. |
| 5,101,953 A | 4/1992 | Payvar |
| 5,176,236 A | 1/1993 | Ghidorzi et al. |
| 5,335,765 A | 8/1994 | Takakura et al. |
| 5,660,259 A | 8/1997 | Peng et al. |
| 5,682,971 A | 11/1997 | Takakura et al. |
| 5,819,896 A | 10/1998 | Fallu |
| 5,921,366 A | 7/1999 | Walth et al. |
| 6,013,696 A | 1/2000 | Hill et al. |
| 6,029,791 A | 2/2000 | Takakura |
| 6,035,991 A | 3/2000 | Willwerth et al. |
| 6,062,367 A | 5/2000 | Hirayanagi et al. |
| 6,293,382 B1 | 9/2001 | Nishide et al. |
| 6,557,685 B2 | 5/2003 | Hattori |
| 6,601,684 B2 | 8/2003 | Collis et al. |
| 6,668,891 B2 | 12/2003 | Collis |
| 6,742,638 B2 | 6/2004 | Maienschein et al. |
| 6,899,783 B2 | 5/2005 | Oguri et al. |
| 6,910,561 B2 | 6/2005 | Sasse |
| 7,163,095 B2 | 1/2007 | Springer et al. |
| 7,172,062 B2 | 2/2007 | Kitahara et al. |
| 7,234,580 B2 | 6/2007 | Li et al. |
| 7,249,663 B2 | 7/2007 | Mordukhovich et al. |
| 7,448,483 B2 | 11/2008 | Arcot et al. |
| 7,513,345 B2 | 4/2009 | Karamavruc |
| 7,597,180 B2 | 10/2009 | Kobayashi et al. |
| 7,650,977 B2 | 1/2010 | Suzuki et al. |
| 7,766,144 B2 | 8/2010 | Mordukhovich et al. |
| 7,958,984 B2 | 6/2011 | Kobayashi et al. |
| 8,051,968 B2 | 11/2011 | Arnold et al. |
| 8,061,498 B2 | 11/2011 | Tsuboi et al. |
| 8,113,330 B2 | 2/2012 | Sudau et al. |
| 8,162,123 B2 | 4/2012 | Hirayanagi |
| 8,205,734 B2 | 6/2012 | Sudau et al. |
| 8,424,664 B2 | 4/2013 | Fabricius et al. |
| 8,657,088 B2 | 2/2014 | Yamashita |
| 8,919,517 B2 | 12/2014 | Dziurda et al. |
| 8,919,518 B2 | 12/2014 | Diemer et al. |
| 8,939,269 B2 | 1/2015 | Chavdar et al. |
| 9,027,728 B2 | 5/2015 | Hiramatsu et al. |
| 9,097,289 B2 | 8/2015 | Youngwerth et al. |
| 9,109,640 B2 | 8/2015 | Reiners |
| 9,188,168 B2 | 11/2015 | Ando et al. |
| 9,212,703 B2 | 12/2015 | Mordukhovich et al. |
| 9,346,128 B2 | 5/2016 | Moch et al. |
| 9,360,053 B2 | 6/2016 | Mordukhovich |
| 9,400,018 B2 | 7/2016 | Kremer et al. |
| 9,523,394 B2 | 12/2016 | Blough et al. |
| 2004/0050646 A1 | 3/2004 | Matthes et al. |
| 2005/0284721 A1 | 12/2005 | Arcot et al. |
| 2007/0000747 A1 | 1/2007 | Miyazaki |
| 2009/0211867 A1 | 8/2009 | Miyazaki |
| 2010/0044182 A1 | 2/2010 | Sakabe et al. |
| 2013/0004717 A1* | 1/2013 | Moch ................ F16D 69/00 428/156 |
| 2014/0014460 A1 | 1/2014 | Kremer |
| 2014/0054125 A1 | 2/2014 | Diemer et al. |
| 2015/0369302 A1 | 12/2015 | Takabayashi et al. |
| 2016/0195150 A1 | 7/2016 | Yamada et al. |
| 2016/0258493 A1* | 9/2016 | Kobayashi ............ F16D 13/68 |

FOREIGN PATENT DOCUMENTS

| | | | |
|---|---|---|---|
| JP | S59113992 A | | 6/1984 |
| JP | H1026159 A | | 1/1998 |
| JP | 2010112459 A | * | 5/2010 |
| JP | 2014133242 A | * | 7/2014 |

* cited by examiner

METHOD OF LASER CUTTING GROOVES IN A FRICTION CLUTCH PLATE

FIELD

The present disclosure relates to friction clutch plates for friction clutch assemblies used in automatic motor vehicle transmissions, and a method of cutting grooves within friction material of the friction clutch plates.

INTRODUCTION

A typical multiple speed automatic transmission uses a combination of friction clutch assemblies, planetary gear arrangements, and fixed interconnections to achieve a plurality of gear ratios. The number and physical arrangement of the planetary gear sets, generally, are dictated by packaging, cost, and desired speed ratios. Friction clutch pack assemblies are commonly used to engage and disengage various gears within a transmission and they typically include interleaved clutch plates that are compressed against a backing plate to selectively couple components of the transmission together.

Friction clutch assemblies may include, for example, a plurality of apply plates interleaved with a plurality of reaction plates. Either or both of the apply plates and the reaction plates may have friction material disposed on one or both of their faces to assist in coupling together the apply plates and the reaction plates when the clutch is engaged. In wet friction clutch assemblies, transmission fluid is used to lubricate and cool the clutch components. Therefore, openings or grooves may be formed through the friction material to allow the fluid to flow past the clutch plates even when they are engaged.

However, cutting or stamping grooves into friction material has some drawbacks. Friction material is typically formed of cellulose and strong fibers, such as carbon fiber, a para-aramid synthetic fiber (e.g., sold under the trademark Kevlar®), as well as clay or clay-like material. The hard fibers are difficult to cut through to form the grooves, and cutting these materials results in frayed edges. The frayed edges may cause erosion and weakening of the friction material at the edges. Instead of cutting grooves into the friction material, the grooves may be stamped. However, stamping grooves into the friction material results in rounded edges adjacent to the grooves. The rounded edges promote the leakage of oil from the grooves onto the surface of the friction material between the friction material and the adjacent plate, squeezing fluid into the interface area. This can cause hydroplaning and unpredictable coefficients of friction between adjacent plates.

SUMMARY

The present disclosure provides a method of forming grooves within friction material facings of clutch plates that results in sharp-corner edges with little or no fraying, which eliminates or greatly reduces the problems of hydroplaning and erosion or weakening of the friction material. The sharp edges may be created by using a focused fine beam laser to cut clean, sharp-edged grooves within the friction material.

In one form, which may be combined with or separate from the other forms disclosed herein, a method of forming a friction clutch plate is provided. The method includes providing a friction material layer for a face of the friction clutch plate and cutting the friction material layer with a laser beam to form a plurality of grooves within the friction material layer.

In another form, which may be combined with or separate from the other forms provided herein, a friction plate for a wet friction clutch pack assembly is provided. The friction plate has an annular core plate having first and second opposed faces and defining an outer edge and an inner edge. Friction material is affixed to at least one of the first and second faces. The friction material defines a plurality of grooves within the friction material. Each groove is bordered by friction material having a ridge between an outer surface and an inner side surface of the friction material. The ridge defines an angle between the outer surface and the inner side surface. A cross-section of the ridge has a corner with a radius of curvature that is less than 300 microns.

In yet another form, which may be combined with or separate from the other forms disclosed herein, a friction clutch assembly is provided that includes an outer member, an inner member, and a plurality of clutch plates. Each clutch plate has a pair of opposed faces. The plurality of clutch plates includes outer clutch plates interleaved with inner clutch plates. Each outer clutch plate has an outer edge defining a plurality of external splines, the outer clutch plates being splined via the plurality of external splines to the outer member. Each inner clutch plate has an inner edge defining a plurality of internal splines, the inner clutch plates being splined via the plurality of internal splines to the inner member. Friction material is disposed at least part of the faces of the clutch plates. The friction material defines a plurality of grooves within the friction material. The friction material has an outer surface connected by a ridge to an inner side surface, where the inner side surface is adjacent to a groove. The ridge defines an angle between the outer surface and the inner side surface. A cross-section of the ridge has a corner with a radius of curvature that is less than 300 microns. An actuator is configured to compress the outer clutch plates and inner clutch plates together to couple the outer and inner members together.

Further additional features may be provided, including but not limited to the following: wherein the step of cutting includes creating an angled ridge between an outer surface of the friction material layer and an inner side surface; a cross-section of each ridge including a corner having a radius of curvature that is less than 300 microns; the laser beam being a first laser beam; the method further comprising ablating excess friction material disposed within the grooves with a second laser beam; the first laser beam having a first beam size and the second laser beam having a second beam size; the second beam size being larger than the first beam size; the first beam size being less than 300 microns in one example; the first beam size being less than 30 microns in another example; the first beam size being in the range of 3 to 7 microns in yet another example; the second beam size being in the range of 0.03 to 1.5 millimeters in one example; the second beam size being in the range of 0.5 to 1.5 millimeters; wherein the step of cutting comprises cutting completely through the friction material layer; wherein the step of cutting comprises cutting partially through the friction material layer, while leaving a portion of the friction material layer intact within each groove; the corner having a radius of curvature in the range of 3 to 7 microns; the outer surface being generally perpendicular to the inner side surface; the ridge defining an angle between the outer surface and the inner side surface; the angle being about 90 degrees; wherein the step of cutting comprises cutting the friction material layer along lines that are parallel to each other; wherein the step of cutting comprises cutting the friction material layer into a plurality of generally triangular friction material dots; the method further comprising stamping a metal base plate; the method further comprising adhering the friction material layer onto the metal base plate; the method further comprising blowing air into the grooves to clean the grooves formed by the step of cutting; a clutch plate formed by any variation of the disclosed method; the corner having a radius of curvature in the range of 4.5 to 5.5 microns; the grooves being formed in the friction material by a laser beam; and the core plate having a plurality of spline teeth extending from at least one of the inner and outer edges.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 7A:
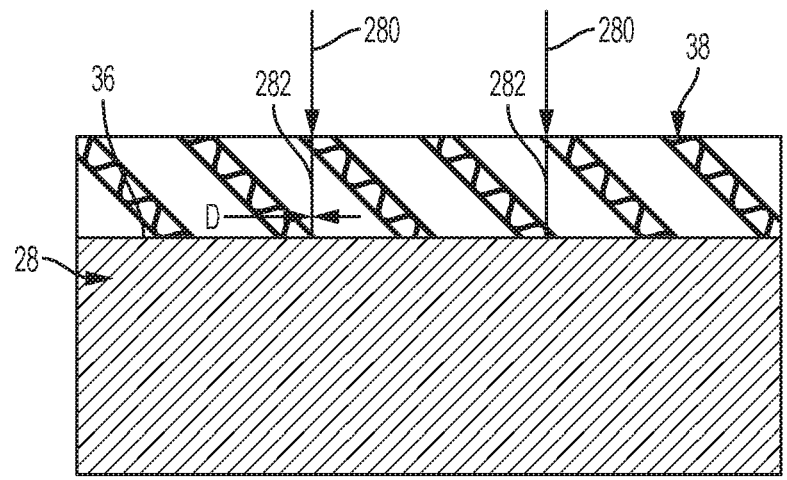
Figure 7B:
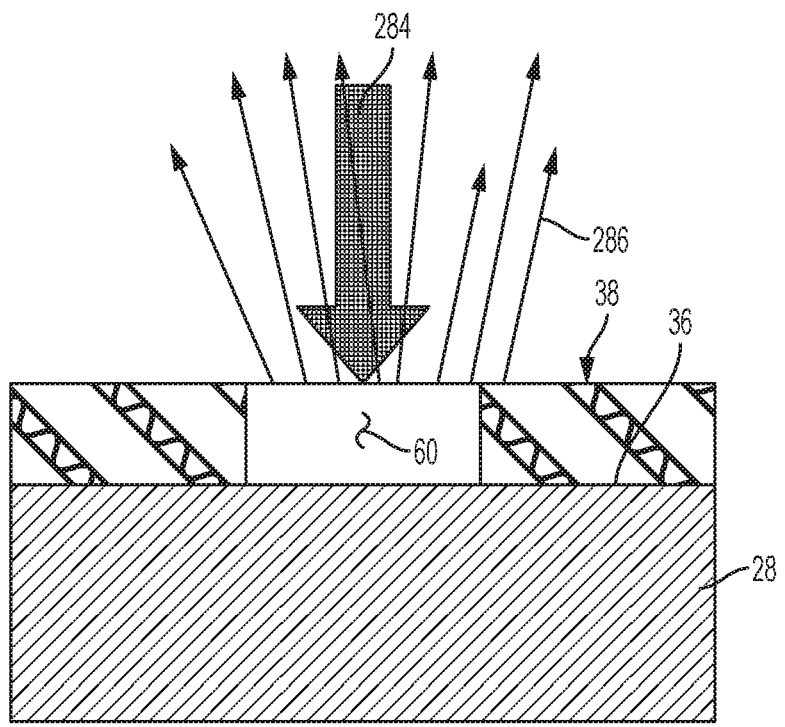

FIG. 7A is a schematic side cross-sectional view illustrating a laser beam applied to the friction material of one of the friction clutch plates illustrated in FIGS. 1-5, to accomplish ablation of a portion of the friction material, according to the principles of the present disclosure; and FIG. 7B is a schematic side cross-sectional view illustrating evaporation of friction material after ablation, in accordance with the principles of the present disclosure.

DETAILED DESCRIPTION

The following description is merely exemplary in nature and is not intended to limit the present disclosure or its application or uses.

Figure 1:
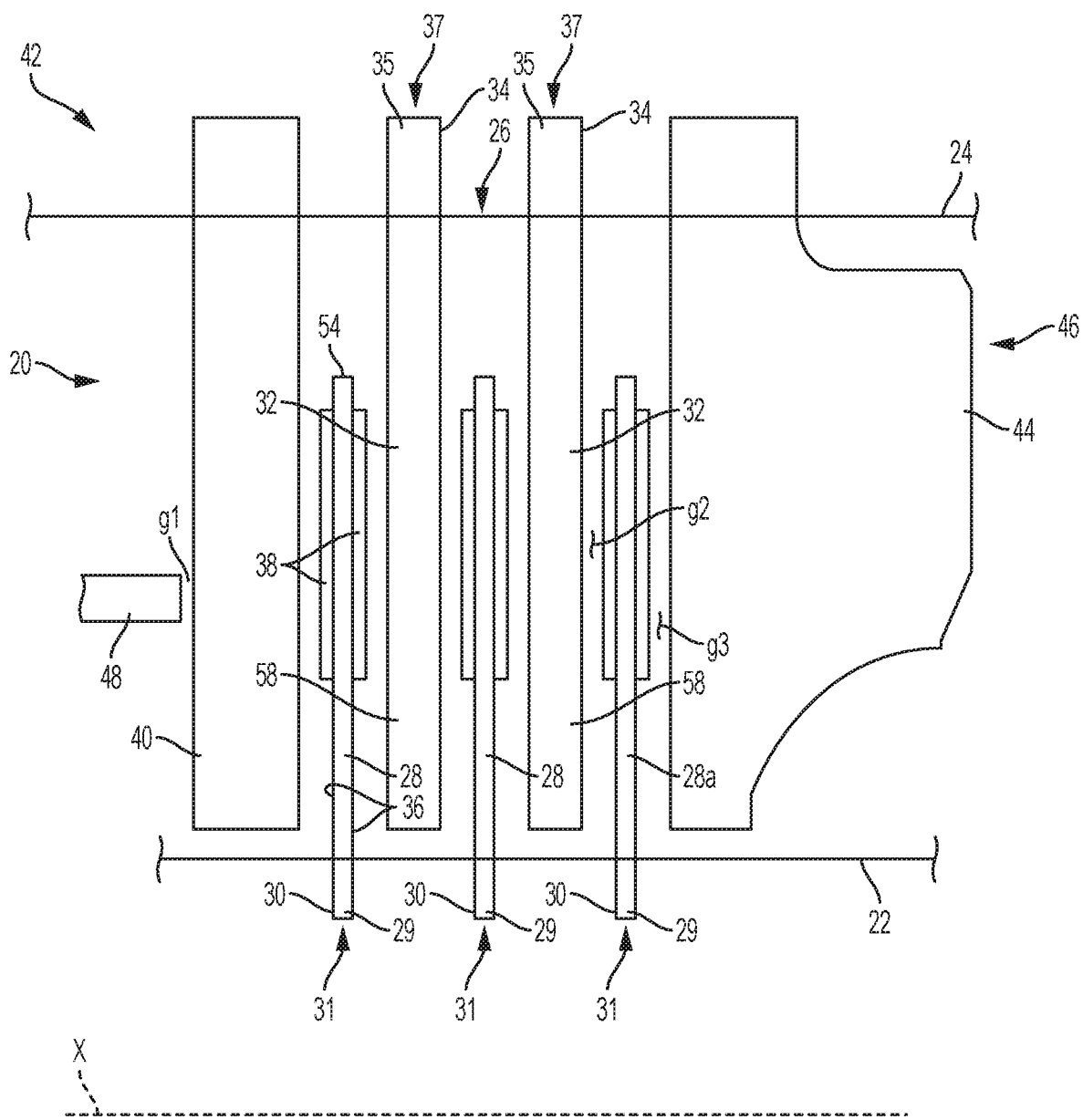
FIG. 1 is a cross-sectional view of a friction clutch assembly having a plurality of friction clutch plates, in accordance with the principles of the present disclosure.

With reference to FIG. 1, an illustration of a portion of a wet friction clutch assembly is illustrated and generally designated at 20. The clutch assembly 20 may be part of an automotive transmission, such as an automatic transmission, that may include a plurality of planetary gear assemblies, which are generally not shown, but one or more gears or members of which may be coupled to a clutch hub 22 and/or a clutch housing 24. The clutch housing 24 may be the entire transmission housing/case, or a smaller clutch housing within the transmission case. The friction clutch assembly 20 is operably disposed between the hub 22 and the housing 24. The friction clutch assembly 20 is configured to selectively couple the hub 22 (and any planetary gear elements, shafts, or stationary elements coupled to the hub 22) to the housing 24 (and any planetary gear elements, shafts, or stationary elements coupled to the housing 24) through a plurality of interleaved clutch plates 26. The hub 22 and housing 24 may be disposed about a transmission central axis X, by way of example. The friction clutch assembly 20 is referred to as a "wet" friction clutch assembly because fluid is configured to lubricate, cool, and flow adjacent to several of the clutch components.

Referring to FIGS. 1-4, the plurality of interleaved clutch plates 26 includes a first plurality of smaller diameter clutch plates, core plates, or discs, referred to as friction plates 28, which are slidably coupled to the hub 22 by interengaging male and female splines 30 of the hub 22 with the friction clutch plates 28. Thus, the hub 22 has a plurality of external splines 30 extending radially outwardly from an outer surface of the hub 22. A plurality of teeth 29 extend along an inner diameter edge 31 of each friction clutch plate 28, and the teeth 29 engage or intermesh with the splines 30 to prevent rotational motion of the friction clutch plates 28 with respect to the hub 22.

In accordance with conventional friction clutch practice, at least one face 36 of each of the friction clutch plates or discs 28 includes friction material 38 disposed thereon. The friction material 38 may comprise fibrous materials. For example, the friction material 38 may be formed of cellulose and strong fibers, such as carbon fiber, a para-aramid synthetic fiber (e.g., sold under the trademark Kevlar®), as well as clay or clay-like material.

A second plurality of larger diameter clutch plates or discs, which are referred to as reaction plates 32 in this example, are coupled to the housing 24 by interengaging male and female splines 34 of the housing 24 with the reaction plates 32. Thus, the housing 24 has a plurality of internal splines 34 extending radially inwardly from an interior surface of the housing 24. A plurality of teeth 35 extend along an outer diameter edge 37 of each reaction plate 32, and the teeth 35 engage or intermesh with the splines 34 to prevent rotational motion of the reaction plates 32 with respect to the housing 24. In this example, the reaction plates 32 are wider and thicker than the friction plates 28, having a greater outer diameter 37 than the outer diameter edge 54 of the friction clutch plates 28. The plurality of reaction clutch plates 32 are interleaved with the plurality of friction clutch plates 28.

An apply plate 40 is disposed at a first end 42 of the friction clutch assembly 20 adjacent to a friction clutch plate 28 in this example, and a backing plate 44 is disposed at a second opposite end 46 of the friction clutch assembly 20 adjacent to an end friction clutch plate 28a in this example. At the first end 42 of the friction clutch assembly 20 (the left end in the orientation of FIG. 1) is disposed a hydraulic, electric, or pneumatic operator or actuator 48, which selectively provides an axial compressive force to the friction clutch assembly 20 to cause torque transfer therethrough and to move the friction clutch assembly 20 into an engaged or applied position. In the engaged or applied position, the plurality of clutch plates 26 are compressed against the backing plate 44 (which is typically held axially by a snap ring (not shown)) to couple the hub 22 to the housing 24. A spring (not shown) may be configured to return the friction clutch assembly 20 to a disengaged, separated, or released position when the actuator 48 is released.

Though two reaction plates 32 and three friction plates 28 are illustrated in FIG. 1, it should be understood that any other suitable number of reaction plates 32 and friction plates 28 could be used, without falling beyond the spirit and scope of the present disclosure. In addition, the placement and size of the reaction plates 32 and the friction plates 28 could be reversed such that the friction plates 28 are larger than the reaction plates 32 and coupled to the housing 24, with the reaction plates being coupled to the hub 22, if desired. Furthermore, the reaction plates 32 could also have friction material 38 disposed thereon, in addition to the friction plates 28 having friction material 38 disposed on their faces 36. Either of the reaction plates 32 or the friction plates 28 could be single-sided friction plates having friction material 38 disposed on one side, but not the opposing side, of each plate.

In FIG. 1, the friction clutch assembly 20 is illustrated in the disengaged, separated, or released position. In the disengaged, separated, or released position, the actuator 48 is disengaged and separated from the apply plate 40, and a small gap g1 may exist between the actuator 48 and the apply plate 40. FIG. 1 also shows minute gaps g2 between each of the clutch plates 28, 32; however, it should be understood that the minute gaps g2 may not be gaps at all, but rather, mere slippage between the friction plates 28 and the reaction plates 32. There may also be a gap g3 or slippage between backing plate 44 and the end friction clutch plate 28a, when the clutch assembly 20 is in the disengaged position.

The clutch assembly 20 is configured to be moved between the disengaged or released position and the engaged or applied position. In the engaged or applied position (not shown), the actuator 48 contacts and compresses the apply plate 40 to compress the pluralities of friction and reaction plates 28, 32 against the backing plate 44. In the engaged or applied position, the transmission members 22, 24 to which the clutch plates 28, 32 are splined are coupled together by compressing the pluralities of clutch plates 28, 32 against the backing plate 44. In the engaged or applied position, there are no gaps g1, g2, g3 and there is negligible or no slippage between the clutch plates 28, 32.

Figure 2:
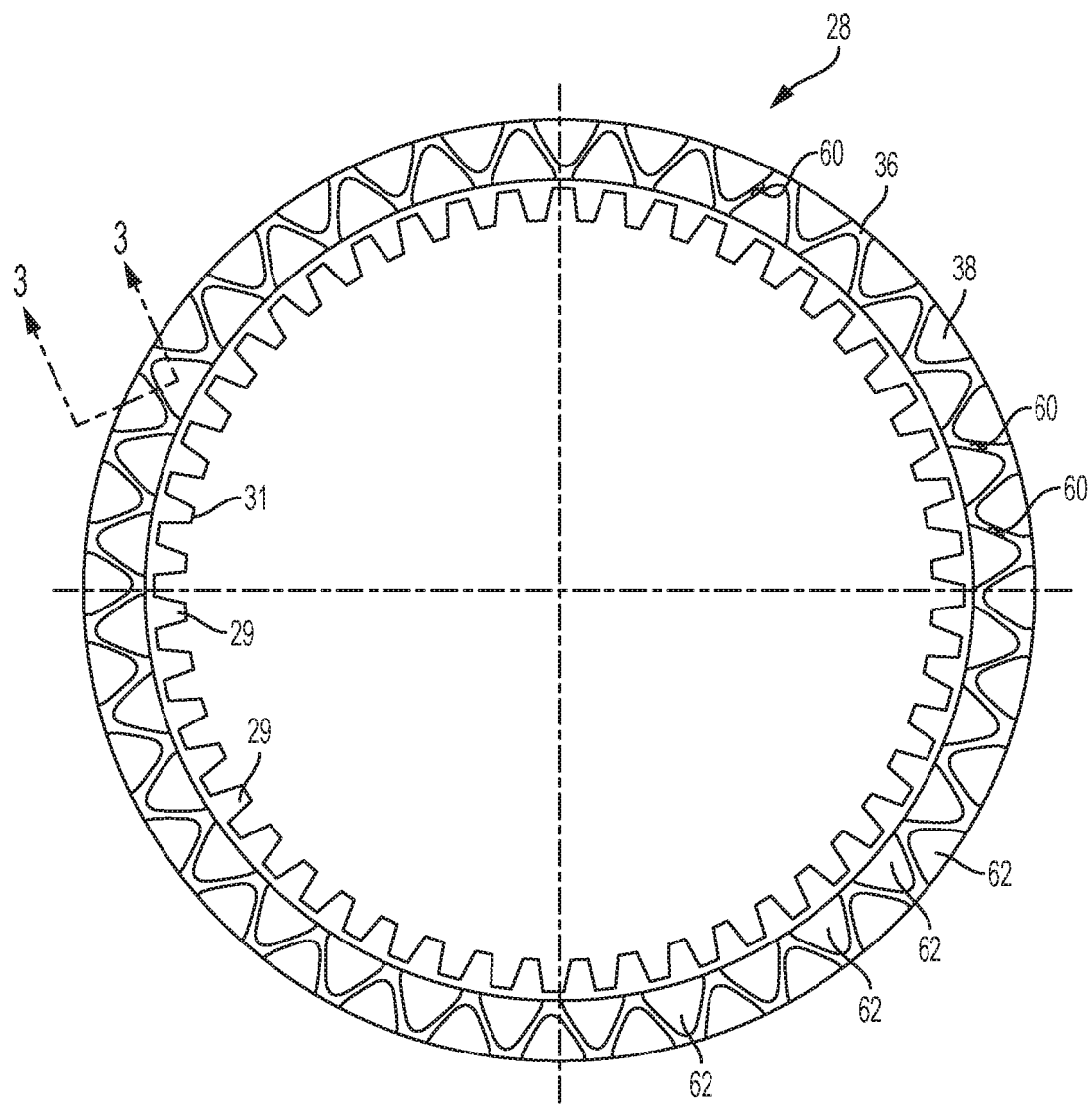
FIG. 2 is a plan view of a friction clutch plate of the friction clutch assembly shown in FIG. 1, according to the principles of the present disclosure.

Referring now to FIG. 2, and with continued reference to FIG. 1, a friction plate 28 is illustrated having the plurality of spline teeth 29 disposed along the inner edge 31. The friction plate 28 has friction material 38, which may be referred to as a friction material layer, disposed on and affixed to a face 36 of the friction plate 28.

When the clutch assembly 20 is engaged, it is desirable to allow fluid to cool and lubricate the components of the clutch assembly 20, even when the friction plates 28 and the reaction plates 32 are coupled together. It would be undesirable for the engaged clutch assembly 20 and/or the friction material 28 to block the flow of fluid. Accordingly, the friction material 38 defines a plurality of grooves 60 within the friction material 38 to allow fluid to flow past the friction material 38 when the clutch assembly 20 is engaged. In the illustrated example, the friction material 38 is shown cut into generally triangular friction material dots 62, but it should be understood that the friction material 38 could be cut into or formed into any desirable shape or number of pieces, or it may be formed all as one piece with grooves that do not extend through the height of the friction material 38.

Figure 3:
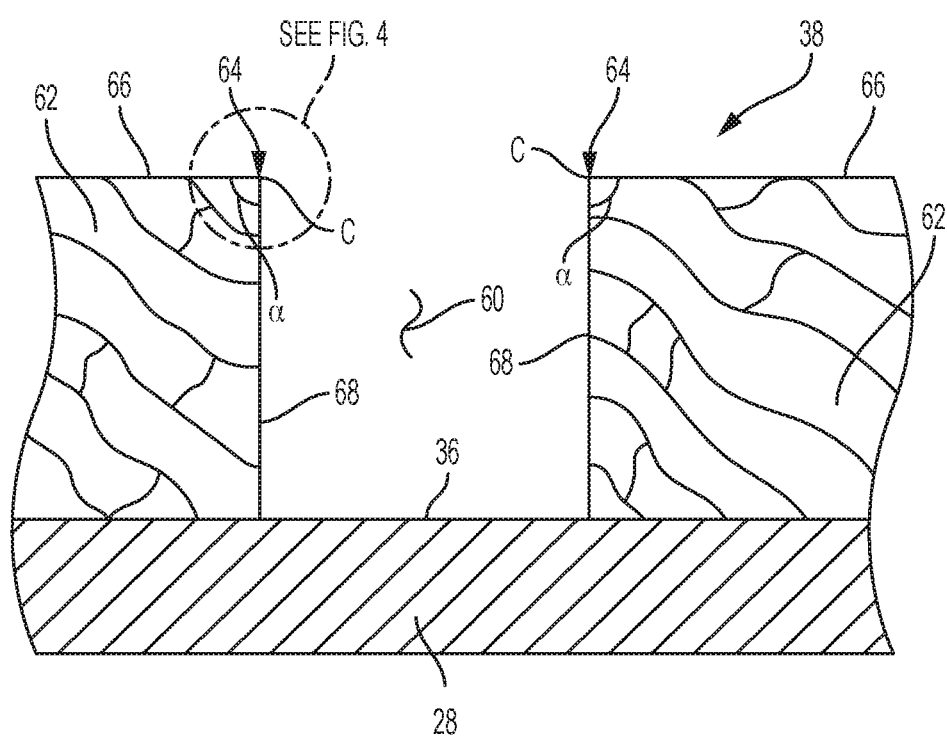
FIG. 3 is a cross-sectional view of the friction clutch plate shown in FIGS. 1-2, taken along the line 3-3 in FIG. 2, in accordance with the principles of the present disclosure.

Referring to FIG. 3, a side cross-sectional view of the friction plate 28 is taken along the line 3-3 in FIG. 2. In FIG. 3, it can be seen that each groove 60 is bordered by friction material 38 having a ridge 64 between an outer surface 66 and an inner side surface 68 of the friction material 38. The ridge 64 defines an angle α between the outer surface 66 and the inner side surface 68. The angle α may have any desirable value, such as, for example, 90-95°. In some cases, the angle α is about 90°, resulting in a squared-off corner C at the ridge 64. In this case, the outer surface 66 may be generally perpendicular to the inner side surface 68.

Figure 4:
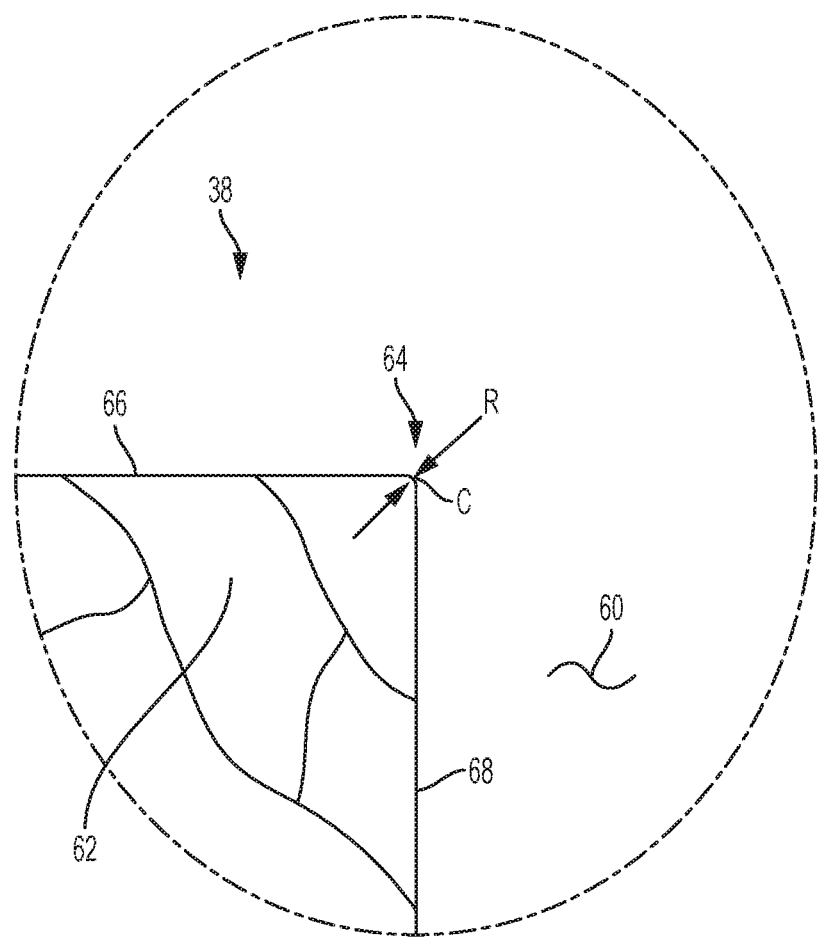
FIG. 4 is a cross-sectional view of a portion of the friction clutch plate shown in FIGS. 1-3, taken along the circle 4 in FIG. 3, according to the principles of the present disclosure.

Thus, referring to FIG. 4, which is a close-up view of the corner C taken along the circle 4 shown in FIG. 3, a cross-section of the ridge 64 has a corner C with a very small radius of curvature R. The radius of curvature R is less than 300 microns, making the corner C appear and function as a substantially sharp, square corner C. However, the radius of curvature R is more preferably much smaller than 300 microns, such as less than 30 microns. In another example, the radius of curvature R is less than 7 microns. In some examples, the radius of curvature R is in the range of 3 to 7 microns, and in some cases, the radius of curvature R may be in the range of 4.5 to 5.5 microns. For example, the radius of curvature R may be about 5 microns.

To create such a sharp-edge corner C along the ridge 64, the grooves 60 may be formed in the friction material 38 by a laser beam, which will be explained in greater detail below.

In some variations, the grooves 60 may be cut all the way through the friction material 38, as shown in FIG. 3, such that a bottom end of the groove 60 is defined by the face 36 of the core plate 28. In other variations, however, the grooves 60 may be cut only part of the way through the friction material 38, such that some friction material 38 remains on the bottom of the groove 60 and forms a bottom surface of the groove 60.

Figure 5:
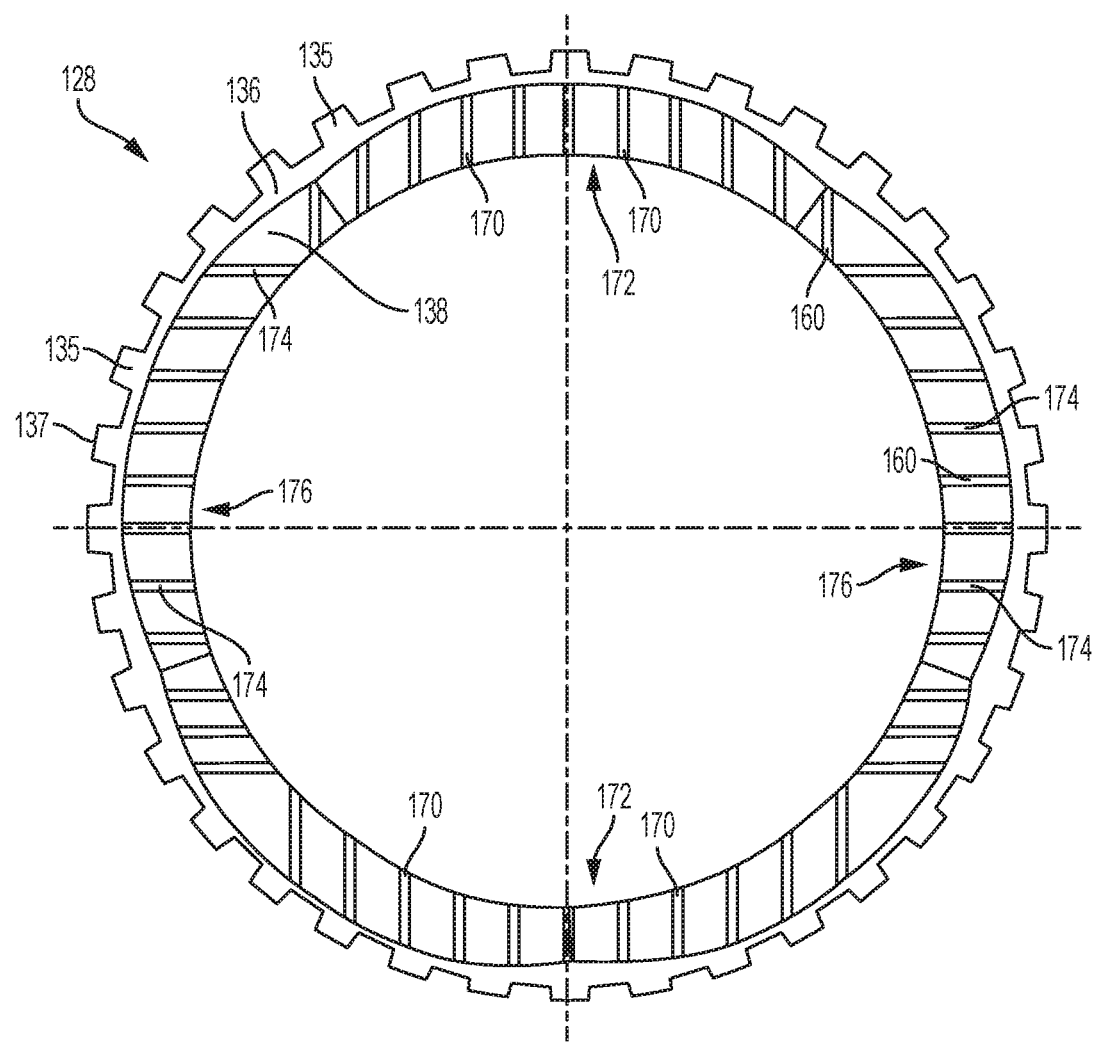
FIG. 5 is a plan view of another variation of a friction clutch plate for use in the friction clutch assembly shown in FIG. 1, according to the principles of the present disclosure.

Referring now to FIG. 5, and with continued reference to FIG. 1, another variation of a friction plate 128 is illustrated. It should be understood that the friction plate 128 could be used in place of the friction plate(s) 28 or the reaction plate(s) 32 described above, and anything not described as being different from the friction plate 28 can be the same as described with respect to the friction plate 28. In this example, the friction plate 128 is the larger diameter plate (in the place of one of the reaction plates 32 shown in FIG. 1), where the plurality of spline teeth 135 are disposed along the outer edge 137 of the metal core plate of the friction plate 128. The friction plate 128 has friction material 138, which may be referred to as a friction material layer, disposed on and affixed to a face 136 of the friction plate 128.

The friction material 138 defines a plurality of grooves 160 within the friction material 138. In the illustrated example, the friction material 138 is cut along first parallel lines 170 on first parts 172 of the friction plate 128, and the friction material 138 is cut along second parallel lines 174 along second parts 176 of the friction material, where the first parallel lines 170 are perpendicular to the second parallel lines 174. It should be understood, however, that any other alternative pattern or shape of the grooves 160 could be cut or formed into the friction material 138 instead of the sets of parallel lines 170, 174.

The grooves 160 may otherwise be the same as the grooves 60 described above with respect to FIGS. 2-4. For example, the grooves 160 may be bordered by friction material 138 having angle ridges between an outer surface and an inner side surface of the friction material 138, as shown and described above with respect to the friction material 38. Moreover, the ridges may have squared-off corners, as described above, and may have any of the small radii of curvature described above with reference to FIGS. 3-4. The grooves 160 may be cut all the way through the friction material 138, or the grooves 160 may be cut only part of the way through the friction material 138, such as described above with respect to the friction material 38.

Figure 6:
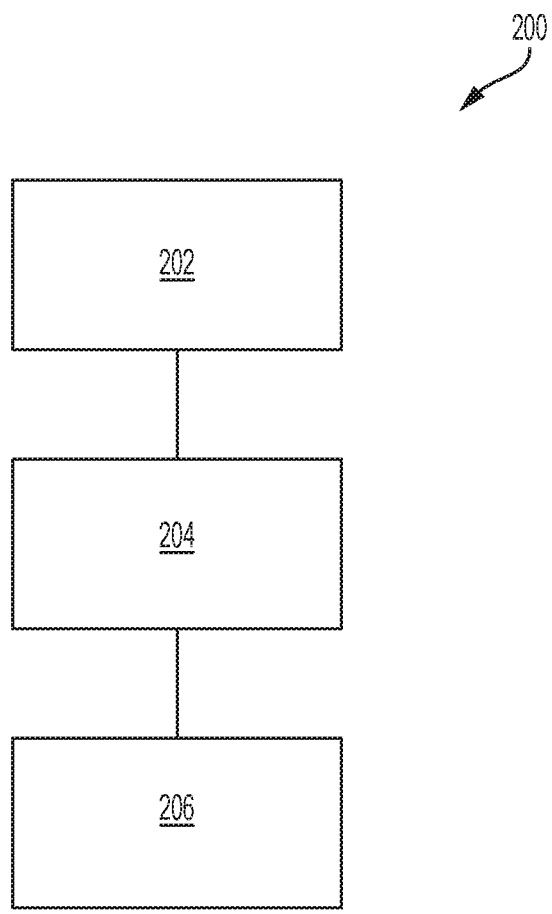
FIG. 6 is a block diagram illustrating a method of forming a friction clutch plate, in accordance with the principles of the present disclosure.

Referring now to FIGS. 6, 7A, and 7B, a method of forming a friction clutch plate, such as the friction clutch plates 28, 128 described above, is illustrated and generally designated at 200. The method 200 includes a step 202 of providing a friction material layer for a face of the friction clutch plate. The method further includes a step 204 of cutting the friction material layer with a laser beam to form a plurality of grooves within the friction material layer.

The step of cutting 204 may include creating the angled ridges 64, such as those shown above in FIGS. 3-4, between the outer surface 66 of the friction material layer 38 and the inner side surface 68, resulting in a cross-section of each ridge 64 including a corner C having a radius of curvature R. The radius of curvature R may be less than 300 microns, less than 30 microns, 3-7 microns, 4.5-5.5 microns, about 5 microns, or having any other desired value.

It is possible to cut such sharp corners without fraying using a fine focused laser beam. For example, the laser beam may have any desired small beam size, such as under 300 microns. In some examples, the beam size is 30 microns or less, and the beam size could be in the range of 3 to 7 microns, to achieve the small radii of curvature R.

Referring to FIG. 7A, the step of cutting 204 is illustrated with two small laser beams 280 that are used to create thin cuts 282 in the friction material 38 that is disposed on the face 36 of the friction plate 28. The laser beams 280 have the small beam size referred to above, resulting in cuts 282 having small diameters D, such as diameters less than 300 microns, less than 30 microns, or even less than 7 microns or 5 microns. Though the cutting step 204 is shown with respect to the friction plate 28, it should be understood that the cutting step 204 could also be applied to the friction plate 128.

The cutting step 204 may include cutting completely through the friction material layer, or cutting partially through the friction material layer while leaving a portion of the friction material layer intact within each groove, by way of example. Further, the cutting step 204 may include cutting the friction material layer 138 along lines 170, 174 that are parallel to each other, as shown in FIG. 5; cutting the friction material layer 38 into a plurality of generally triangular friction material dots 62, as shown in FIG. 1; or cutting the friction material 38, 138 into any other desirable pattern of grooves, including even intricate curved patterns of grooves, if desired.

The method 200 may further include a step 206 of ablating excess friction material disposed within the grooves with a second laser beam. For example, referring to FIG. 7B, a second (ablating) laser beam is represented by the arrow 284, which can be larger than the cutting laser beam 280. After being cut by the laser beam 280, the friction material 38 may be irradiated by the ablating laser beam 284 to ablate the friction material 38.

Referring to FIG. 7B, at a low laser beam power, the friction material 38 is evaporated or vaporized as indicated by arrows 286 as the ablation beam 284 is applied, to create the grooves 60 within the friction material 38. The ablation step 206 may be performed by the second laser beam 284 having a second beam size that is larger than the beam size used for cutting, shown in FIG. 7A as beam arrows 280. In addition, the second beam 284 may be unfocused, while the laser beam 280 used for cutting is focused. In some examples, the second beam size is in the range of 0.03 to 1.5 millimeters, or in the range of 0.5 to 1.5 millimeters, by way of example. In some examples, the second beam size may be about 1 millimeter.

Prior to (or after) the cutting step 204, the method 200 could also include stamping a metal base plate and/or adhering the friction material layer onto the metal base plate, such as with glue or another bonding agent.

After the ablation step 206, the method 200 can optionally include blowing air into the grooves to clean the grooves formed by the step of cutting and/or ablating, if desired.

The method 200 may result in a friction clutch plate 28, 128 that has angled ridges with sharp corners, as described above with respect to FIGS. 2-5.

The description provided herein is merely exemplary in nature, and variations that do not depart from the gist thereof are intended to be within the spirit and scope of the present disclosure. Such variations are not to be regarded as a departure from the spirit and scope of the present disclosure.

What is claimed is:

1. A method of forming a friction clutch plate, the method comprising:
   providing a friction material layer for a face of the friction clutch plate; and
   cutting the friction material layer with a laser beam to form a plurality of grooves within the friction material layer,
   wherein the step of cutting includes creating an angled ridge between an outer surface of the friction material layer and an inner side surface defining an edge of a groove of the plurality of grooves, a cross-section of each angled ridge including a corner having a radius of curvature that is less than 300 microns.

2. The method of claim 1, the laser beam being a first laser beam, the method further comprising ablating excess friction material disposed within the plurality of grooves with a second laser beam.

3. The method of claim 2, further comprising providing the first laser beam having a first beam size and the second laser beam having a second beam size, the second beam size being larger than the first beam size.

4. The method of claim 3, further comprising providing the first beam size in the range of 3 to 30 microns, and providing the second beam size in the range of 0.03 to 1.5 millimeters.

5. The method of claim 4, further comprising providing the first beam size in the range of 3 to 7 microns, and providing the second beam size in the range of 0.5 to 1.5 millimeters.

6. The method of claim 5, wherein the step of cutting comprises cutting completely through the friction material layer.

7. The method of claim 5, wherein the step of cutting comprises cutting partially through the friction material layer, while leaving a portion of the friction material layer intact within each groove of the plurality of grooves.

8. The method of claim 5, the corner having a radius of curvature in the range of 3 to 7 microns, the outer surface being generally perpendicular to the inner side surface, and the angled ridge defining an angle between the outer surface and the inner side surface, the angle being about 90 degrees.

9. The method of claim 8, wherein the step of cutting comprises cutting the friction material layer along lines that are parallel to each other.

10. The method of claim 8, wherein the step of cutting comprises cutting the friction material layer into a plurality of generally triangular friction material dots.

11. The method of claim 8, further comprising:
   stamping a metal base plate;
   adhering the friction material layer onto the metal base plate; and blowing air into the plurality of grooves to clean each groove of the plurality of grooves.

\* \* \* \* \*